United States Patent [19]

Meszaros

[11] Patent Number: 4,992,078
[45] Date of Patent: Feb. 12, 1991

[54] SULFUR DYES AND METHOD OF PREPARING SAME: MEMBRANE PROCESS

[75] Inventor: Laszlo A. Meszaros, Charlotte, N.C.

[73] Assignee: Sandoz Ltd., Basel, Switzerland

[21] Appl. No.: 314,730

[22] Filed: Feb. 23, 1989

[51] Int. Cl.$^5$ .................. D06P 5/20; C09B 49/00; C09B 67/28
[52] U.S. Cl. ............................ 8/444; 8/532; 8/650; 8/652; 8/918; 8/921; 8/924; 8/927
[58] Field of Search ................... 8/444, 652

[56] References Cited

U.S. PATENT DOCUMENTS

| | | | |
|---|---|---|---|
| 4,329,145 | 5/1982 | Koll et al. | 8/527 |
| 4,390,342 | 6/1983 | Bruttel et al. | 8/524 |
| 4,466,900 | 8/1984 | Horlacher et al. | 252/301.23 |
| 4,560,746 | 12/1985 | Rebhan et al. | 534/840 |
| 4,689,048 | 8/1987 | Fortsch et al. | 8/524 |
| 4,851,011 | 7/1989 | Lacroix et al. | 8/527 |
| 4,865,744 | 9/1989 | Hartling et al. | 210/651 |

FOREIGN PATENT DOCUMENTS

| | | |
|---|---|---|
| 184993 | 6/1986 | European Pat. Off. |
| 263791 | 4/1988 | European Pat. Off. |
| 3311294 | 10/1964 | Fed. Rep. of Germany |
| 3235747 | 4/1983 | Fed. Rep. of Germany |
| 3301870 | 7/1984 | Fed. Rep. of Germany |
| 3539727 | 5/1986 | Fed. Rep. of Germany |
| 54-101833 | 8/1979 | Japan |

OTHER PUBLICATIONS

Orton, D. S., in Venkataraman's, "The Chemistry of Synthetic Dyes", vol. VII, (Academic Press, 1974), pp. 26-30.
Coldur Index (Third Edition), vol. 4, 1971, pp. 4475-4476.
Colour Index (Third Edition), vol. 3, 1971, pp. 3649-3651.

Primary Examiner—A. Lionel Clingman
Attorney, Agent, or Firm—Gerald D. Sharkin; Richard E. Vila; Thomas C. Doyle

[57] ABSTRACT

Improved sulfur dye dispersions are obtained by subjecting an aqueous suspension of oxidized sulfur dye particles to membrane separation. The oxidized sulfur dye is obtained by controlled aeration whereby the content of sulfides, polysulfur and inorganic salts is significantly decreased.

44 Claims, No Drawings

SULFUR DYES AND METHOD OF PREPARING SAME: MEMBRANE PROCESS

The present invention relates to oxidized sulfur dyes and to a method for producing such dyes.

More particularly, the invention relates to oxidized sulfur dyes which are substantially free of inorganic sulfides and which are useful in dyeing procedures which do not employ inorganic sulfides as reducing agents, especially such dyeing procedures wherein reduction is effected by the use of a reducing sugar, such as glucose, in an alkaline medium.

The sulfur dyes of this invention are in the form of water-insoluble solid particles which are obtained in the form of an aqueous dispersion, but which may be converted to the dry state by further treatment.

The dyes of this invention comprise dyestuff particles the majority of which and preferably all of which have a size no greater than 20 microns, preferably no greater than 16 microns, more preferably no greater than 8, especially 4.5, microns. It is particularly preferred that at least 50% of the dyestuff particles be no larger than 4 microns, more preferably no larger than 2.5 microns. The minimum size of the particles is such as will preclude their passage into or through a membrane as described below. Preferably, such particles are at least 0.01 micron, more preferably at least 0.05 micron, most preferably at least 0.1 micron in size. It is particularly preferred that at least 90% of the dyestuff particles be at least 0.1 micron in size.

The inorganic sulfide (e.g. sodium sulfide, sodium hydrosulfide and sodium polysulfide) content of the dyes of this invention is so low that an aqueous dispersion thereof, upon being acidified to pH 5, will not emit hydrogen sulfide. Preferably the dyes of this invention are completely free of inorganic sulfide. An aqueous dispersion of such a preferred dye will not emit any hydrogen sulfide when acidified to pH 3 and will have a reduction equivalent of 0. The reduction equivalent may be determined by potentiometric titration with 0.2 N cupric ammonium sulfate.

The dyes of this invention are further characterized by their low content of total inorganic salts and other water-soluble impurities. Preferably, the inorganic content is such that burning of a sample of the dye will result in an ash content which is less than 7%, more preferably less than 2%, most preferably less than 0.5% by weight, based on the total dry weight of the dye product.

Preferably, the dyes of this invention are essentially linear in their chemical structure. That is they are preferably free of crosslinked polycondensation products. Such a preferred dye will dissolve in water at a temperature of 100° C. in the presence of 7.5 to 30 g/l sodium hydroxide and 45–120 g/l glucose as the sole reducing agent to form a solution which has such a low content of undissolved material as will give dyeings on cotton which are characterized by a smooth appearance. More preferred dyes will give solutions as described above which are completely free of undissolved material. Most preferred dyes will dissolve in water to an extent of at least 120 g/l at 100° C. in the presence of 15 to 23 g/l sodium hydroxide and 60 to 90 g/l glucose as sole reducing agent without introducing any undissolved material.

Preferably, the dyes of this invention are free of sulfonic acid and sulfinic acid groups.

The improved dyes of this invention are produced by a process which comprises subjecting an aqueous suspension of an oxidized sulfur dye, said dye being in the form of solid particles having a desired particle size as described above, to separation by a semipermeable membrane.

The semipermeable membrane use din the process of this invention should have a pore size which will prevent passage therethrough of the desired size dye particles but will permit passage therethrough of water, inorganic salts, such as sodium chloride, sodium sulfate and sodium thiosulfate, and other dissolved impurities. Preferably, the membrane has a pore size giving a cut-off no lower than molecular weight 500. More preferably, the pore size will be at least 0.002 micron, most preferably at least 0.01 micron. The maximum pore size is preferably 0.3 micron, more preferably 0.2 micron.

The membrane may be made of any material which is compatible with the material being treated and not adversely effected by the temperature and pH conditions used. Suitable membrane materials include but are not limited to organic polymers, such as polyvinylidene fluoride, cellulose acetate, polytetrafluoroethylene, polyacrylonitrile, polyethyleneimine, polypropylene, polysulfone, polyamide, polyvinyl alcohol and copolymers of acrylonitrile with other ethylenically unsaturated monomers, and also inorganic materials, such as porous glass, porous metal or metal alloys, porous carbon or porous ceramic. The membrane may also be of various forms, such as tubular, hollow fiber, spiral-wound and plate-and-frame.

The aqueous suspension of oxidized sulfur dye to be subjected to membrane separation according to the present invention should be of such a concentration that it is readily pumpable. Such a suspension usually contains about 5 to 50%, more usually 10 to 35%, especially about 15 to 25% by weight of material other than water. Preferably, the suspension is the same as obtained from the oxidation of a thionation mass in the manufacture of a sulfur dye.

The suspension is separated at a temperature of 15 to 50° C., preferably 20 to 35° C., especially about 25° C. and a pH of 3.5 to 8.5, preferably 4.5 to 6.5, more preferably 5 to 6.

The pressure and flow velocity can be varied somewhat, depending on the particular membrane employed and the characteristics of the dye suspension, so that a suitable rate of permeate output is achieved without undo expenditure of energy or fouling of the membrane. It is within the skill of the art to determine suitable parameters without undo experimentation.

During the membrane separation treatment, fresh water is added to the suspension to replace water removed as permeate. Preferably, the fresh water is added at a rate which will maintain an essentially constant volume of suspension. This added water may be regular tap water or any other water which does not have a higher salt content than is desired in the final product. The pH of the added water should be adjusted, if necessary, to maintain the pH of the suspension as specified above, for example by addition of sulfuric acid or preferably acetic acid.

The membrane separation treatment as described above is continued until the inorganic salt content of the suspension has been lowered to the desired level. This may be determined by measuring the conductivity of the permeate, for instance with a Chemtrix Type 700 conductivity meter. Using this method the addition of water is preferably continued until the permeate has a conductivity of less than 1000, more preferably less than 900, most preferably less than 400 microns/cm. A sufficient reduction in salt content is usually achieved by adding about 3 to 10 times, preferably 4 to 7 times, especially about 5 times the original volume of water during the membrane separation treatment.

Additional membrane separation may be carried out under the same conditions as described above but without the addition of water. This serves to increase the concentration of the suspension as water is removed therefrom as permeate without being replaced. When this type of membrane separation treatment is carried out before the treatment with water addition, the amount of water which has to be added to the more concentrated dispersion to effect the same reduction in salt content and the attendant treatment time are reduced. However, care must be taken to avoid fouling of the membrane and/or overworking the pump. Alternatively, the dispersion may be concentrated after the salt content has been reduced to the desired level. The particular final concentration of the dispersion is not critical and will depend on the capacity of the pumping equipment being used and the desired characteristics of the particular dye dispersion being produced. Typically, the dispersion will be concentrated to a dyestuff content of about 5 to 30%, preferably 7 to 15%, by weight.

If desired, the stability of the resulting dispersion may be enhanced by the addition of an effective amount of a suitable surface active agent.

Preferably the amount of surface drive agent is such as will inhibit agglomeration of the particles. More preferably, the total amount of surface active agent, (including any remaining from what may be added during thionation and/or aeration, as discussed further on) is about 10 to 60% of the amount which would be needed to produce a stable dispersion of the same dye from a presscake without membrane separation.

The particular surface active agent employed is not critical and may be any such compound which is effective for promoting the dispersibility of a sulfur dye in water. Anionic and nonionic compounds are usually employed, such as adducts of 3 to 50 mols of alkylene oxides, particularly ethylene oxide and/or propylene oxide, with a fatty acid, fatty acid amide, fatty alcohol, fatty amine, alkyl phenol or alkyl-thiophenol in which the alkyl radicals have at least 7 carbon atoms; block polymers of ethylene oxide with higher alkylene oxides; nonionic esters of adducts of alkylene oxides, e.g. the tertiary phosphoric acid ester of the adduct of 40 mols ethylene oxide with nonylphenol; ester of polyalcohols, especially monoglycerides of fatty acids having 12 to 18 carbon atoms; N-acylated alkanolamines; mixtures of doils; sulfated or phosphated alkylene oxide adducts of fatty acids, fatty acid amides mercaptans or amines, or of a aliphatic alcohols or alkyl phenols; alkylsulfonates, dialkylsulfosuccinates, alkylbenzenesulfonates, condensation products of naphthalenesulfonic acids with formaldehyde, lignin sulfonates, oxyligninsulfonates and condensation products of ditolyl ether, formaldehyde and sulfuric acid.

Optionally, the dispersion may be spray-dried or otherwise treated to provide the dye in the form of dry solid particles.

The desired particle size for the dye of this invention may be achieved in a variety of ways. In some instances, the product obtained from the thionation and oxidation steps may already have the desired particle size. In order to promote such particle size formation during these steps, an effective amount of a surface active agent, such as described above, may be added to the materials being processed, as will be discussed further on.

Alternatively or in addition to whatever particle size control is achieved during thionation and/or oxidation, particle size reduction can also be effected by mechanical means prior to the membrane separation step. For instance, a conventional milling operation may be carried out. On the other hand, in accordance with a preferred embodiment of the present invention, a high shear pump is used to pump the dispersion from a holding tank to the membrane and the sheering action of such pump is effective to reduce the particle size to the desired range. Such a pump may be an immersible pump located in the holding tank or an in-line pump located between the holding tank and the membrane. Such an in-line pump may be a centrifugal pump with an open impeller or a dispersator pump or disintegrator pump with a bypass arrangement whereby the pumping action of the high sheer pump can be supplanted by the pumping action of a conventional pump once the desired particle size has been achieved. The "holding tank" is conveniently the same vessel in which the dye is precipitated, as will be discussed below.

The sulfur dye suspension which is filtered according to the present invention is itself the product of the oxidation of a thionation (sulfurization) reaction mixture. The precipitation of sulfur dyes by aeration or chemical oxidation of a thionation reaction mixture is conventional and is discussed, for instance, in the Colour Index, volume 4, third edition (1971) pages 4475–4501. According to the present invention, this precipitation step is preferably carried out under controlled conditions to produce a dyestuff slurry which is particularly suited for membrane filtration.

The thionation product is diluted with water is necessary to obtain an easily stirrable mixture, usually about 2 to 4 times the weight of the thionation reaction mixture, and the dye is precipitated, preferably by aeration optionally in conjunction with other oxidizing agents such as sodium nitrite, at a temperature of 50° to 100° C., preferably 75° to 95° C. It has been noted that the particle size of the precipitated dye tends to increase with increased temperature and/or rate of aeration. It is, therefore, preferable to control these parameters so as to favor the production of particles within the desired size range.

The oxidation (aeration) is carried out until the reaction mixture is free of inorganic sulfides. This point is indicated when the reduction equivalent of the reaction mixture is zero, as may be determined by potentiometric titration with 0.2 N cupric ammonium sulfate solution.

It is preferable that the polysulfur content of the dye suspension also be very low, more preferably zero. Aeration of the suspension to a reduction equivalent of zero may also serve to reduce the polysulfur content to the desired level. It is advisable to carry out a trail aeration to zero reduction potential and then test the product for polysulfur content. This can be done by treating a sample of the product with excess sodium sulfide followed by calorimetric titration of the sample with sodium cyanide. If the polysulfur content is found to be too high, then the precipitation step for that particular dye is preferably modified to include treatment with a polysulfur-lowering-effective amount of sodium sulfite and/or sodium nitrile prior to the aeration.

Preferably, the aeration is discontinued as soon as possible after the sulfides have been eliminated. If has been found that overoxidation can lead to the formation of crosslinked polycondensation products which are not readily reducible by glucose-caustic and which are, therefore, not desirable in the product of this invention. It is convenient to monitor the particle size of the suspension, e.g. with a particle size analyzer, and to discontinue aeration before an increase in particle size begins to occur.

Unlike conventional methods for precipitating sulfur dyes from thionation masses, it is preferred that no salt be added to the thionation product during the precipitation step.

It is sometimes advantageous to add a surface active agent, such as described above, to the aqueous mixture of the thionation mass prior to or near the beginning of the precipitation step. The amount of surface active agent is preferably sufficient to inhibit agglomeration of the dye particles during the oxidation and is usually about 10 to 60% of the amount which would be needed to form a dispersion of the precipitated dye from presscake without the membrane separation treatment. Depending on the particular surface active agent and the pore size of the membrane, some or all of the surface active agent may be separated from the dye particles during the membrane separation step. This may be replaced after the membrane separation, as discussed above.

When the desired end point of the precipitation step has been reached, the introduction of air or other oxidizing agent is discontinued and the resulting suspension is cooled to 25° to 55° C., preferably 35° to 45° C. and the pH is adjusted to 3.5 to 8.5, preferably 4.5 to 6.5, more preferably 5 to 6, usually by addition of acetic acid or sulfuric acid.

The resulting suspension of precipitated sulfur dye is conveniently pumped directly to a membrane separation unit for treatment as described above. Preferably, no filtration of the suspension is effected between the precipitation step and the membrane separation treatment.

The improved sulfur dyes of the present invention may be produced from any thionation (sulfurization) mass obtained by known thionation reactions, such as those described in the above-referred portion of the Colour Index. Representative of such dyes are CI Sulfur Blacks 1 (Const. No. 53185), 2 (Const. No. 53195) and 18, CI Sulfur Greens 2 Nos. 53440 and 53450), CI Sulfur Red 10 (Const. No. 53228) and 14, CI Sulfur Brown 37 and CI Sulfur Yellow 22.

With some dyes it may be useful to add a surface active agent, as described above, to the thionation reactants. However, this is preferably done at a later stage of the process.

The products produced by the process of this invention are sulfur dye dispersions which are eminently suited for dyeing textile materials. They are free from offensive odors and considerably less harmful to the environment than previously available products which contain sulfides. Because of their greater purity they give stronger and brighter dyeings and can be applied by continuous methods without the need for corrections. They can be used in the conventional methods for dyeing with sulfur dyes, but are especially suited for use in dyeing procedures employing reducing systems which are free from inorganic sulfides, particularly reducing systems based on reducing sugars, such as glucose.

These products can be used for dyeing cellulosic or cellulosic-polyester blends as well as other fibers, such as triacetate, acetate, acrylics and nylon.

They can be mixed with glucose and sodium hydroxide and applied by padding the resulting mixture on the fabric, followed by steaming at 100°-104° C. for 30-200 seconds and then washing. They can also be applied by conventional batch dyeing methods.

The invention will be illustrated by following examples in which parts and percentages are by weight and temperature are in degree centigrade, unless otherwise indicated.

EXAMPLE 1

To 200 parts of a thionation mass for C.I. Sulfur Blue 13 prepared as disclosed in the Colour Index, third edition, volume 4, page 4494 under C.I. Constitution No. 53450 are added 660 parts water and 0.5 part Surfynol 104E, a surface active agent comprising a mixture of ethylene glycol and 2,4,7,9-tetramethyl-5-decyne-4,6-diol. The resulting mixture is heated to 90°-92° and air is introduced into the mixture with stirring at a pressure of 18 psi (124 k Pascals). After 3 hours the introduction of air is discontinued and the mixture, which has a reduction equivalent of 0, is cooled to 25° and acidified to pH 5.6 with 2.5 parts 70% sulfuric acid. The resulting suspension has a conductivity of 1800 micromhos/cm and comprises dye particles of which the largest is 38.1 microns and 50% are 4.05 microns or smaller. Evaporation of a small sample to dryness shows a dry content of 23.1%. Burning of the dry sample leaves an ash content of 71% based on the weight of the dried sample.

The suspension produced above is pumped by an inline centrifugal pump to a membrane separation unit Model No. O-SMO-10CHF-UF-PES from Osmonics, Inc. equipped with a spiral-wound polysulfone membrane with a pore size having a molecular weight cut-off of 800. Average premembrane pressure is about 83 psi (572 k Pascals) and average postmembrane pressure to about 5 psi (34 k Pascals). The suspension is pumped at a temperature of about 25° and a rate of about 16 parts per minute with occasional reversing of the flow to clear the membrane. Water having a conductivity of 65 micromhos/cm and pH 6 is added to the suspension to maintain a constant volume until the conductivity of the permeate has decreased to 860 micromhos/cm, about 3300 parts water being added. The addition of water is discontinued and the membrane separation treatment is continued with removal of permeate until the suspension is concentrated to a weight of 350 parts. The total time of the treatment is about 4 hours.

The resulting product is a dispersion of CI Sulfur Blue 13 particles wherein 100% of the particles are not larger than 5.1 microns and 50% are no larger than 2.4 microns as determined using a Malvern (Master Sizer) Particle Size Distribution Analyzer MS1002. The dispersion has a dry content of 6.89% of which inorganic impurities, as measured by ash content, comprise only 5.6%.

EXAMPLE 2

To 1050 parts of a thionation mass for CI Sulfur Blue 7 prepared as disclosed in the Colour Index under CI Constitution No. 53440 are added 3200 parts water. The resulting mixture is heated to 80° and air is introduced into the mixture with stirring. After 4 hours the introduction of air is discontinued and the mixture, which has a reduction equivalent of 0, is cooled to 25° and acidified to pH 6 with 34.04 parts 74% sulfuric acid. Four parts of Surfynol 104E surface active agent are added. The resulting suspension has a conductivity of 26,000 micromhos/cm and comprises dye particles of which the largest is 30.8 microns and 50% are 3.03 microns or smaller.

The suspension produced above is pumped via an in-line air-driven flexible impeller pump to a membrane separation unit Model No. KOCH-TR-6-604-0081 equipped with a tubular polysulfone membrane having a pore size of 0.2 micron. Average pre- and postmembrane pressure is about 7.25 psi (49.9 k Pascals). The suspension is pumped at temperature of 30°-33° while water having a conductivity of 95 micromhos/cm and a pH 8.9 is added to the suspension to maintain a constant volume. After about four hours the permeate has a conductivity of 300 micromhos/cm and the addition of water is discontinued. Membrane separation is continued for an additional 30 minutes. The total amount of permeate collected is 32,960 parts.

The resulting product is a dispersion of CI Sulfur Blue 7 particles wherein 100% of the particles are no larger than 13.2 microns and 50% are no larger than 1.96 microns. The dispersion has a dry content of 11.9% which, in turn, has an ash content of 0.19%.

EXAMPLE 3

To 400 grams of a thionation mass for CI Sulfur Black 18 prepared by thionating a mixture of nitroanthraquinones with sodium sulfide and sulfur at 310° C. are added 1500 grams water, 3 cc Surfynol 104 E and 99.3 grams 50% to 90° and air is introduced at a rate of 1.46 l/min. (atmospheric) for 40 hours. Aeration is discontinued and the mixture, having a reduction equivalent of 0, is cooled to 25° and acidified to pH 6 with 28.23 g 74% sulfuric acid. The resulting suspension has a conductivity of 48,000 micromhos/cm and comprises particles of which the largest is 20.1 microns and 50% are 3.57 microns or smaller.

The suspension produced above is pumped via a peristaltic pump to a laboratory scale membrane separation unit from Sartorious Corp. equipped with a plate-and-frame polypropylene membrane having a pore size of 0.1 micron. Average pre- and postmembrane pressure is 5 psi. The suspension is pumped at a temperature of 25° with fresh water (conductivity 75 micromhos/cm; pH 8.9) being added to the suspension to maintain a constant volume. After 75 minutes the conductivity of the permeate is 81 micromhos/cm and the addition of water is discontinued and membrane separation is continued for an additional 15 minutes. A total of 9040 g. permeate is collected.

The resulting product is a dispersion of CI Sulfur Black 18 parts wherein 100% are no larger than 15.6 microns and 50% are no larger than 3.14 microns.

APPLICATION EXAMPLE A

A dyebath is prepared with 0.9 part of the dye dispersion of Example 1, 1.2 parts glucose, 0.2 part 50% sodium hydroxide solution and sufficient water to give a total weight of 250 parts. The dyebath is heated to 82° and 10 parts of wet-out cotton skeins are introduced. Dyeing is carried out for 15 minutes, 6 parts of sodium chloride are added and dyeing is continued for an additional 30 minutes. The cotton skins are then removed from the dyebath and washed with warm water and then with hot water. The skein are then treated for 10 minutes at 60° in an aqueous oxidizing bath containing 2% acetic acid, 2% Dyetone (an aqueous mixture of sodium bromate, sodium nitrate and sodium vanadate from Olin Corp.) and 0.25% of a commercial scouring agent comprising fatty dicarboxylic acid and ethoxylated fatty alcohol. The skeins are then washed with hot water followed by warm water and dried. An excellent blue dyeing is obtained.

APPLICATION EXAMPLE B

A dye liquor is made up containing 6.5 ounces per gallon (opg) of the dispersion of Example 2, 8 opg glucose, 4 opg 50% sodium hydroxide and 1 opg of 2-ethylhexylphosphate ester. The bath is heated to 43°. A cotton textile material is padded with the above-described dye liquor and then steamed for 1 minute with saturated steam. It is then washed with warm, then hot water and oxidized for 30 seconds at 60° in a bath containing 1 opg acetic acid, 1 opg Dyetone and 0.24 opg of the scouring agent used in Application Example A. It is then washed again with hot and then warm water and dried. An excellent blue dyeing is obtained.

I claim:

1. A process for the production of an aqueous dispersion of an oxidized sulfur dye having a lowered content of inorganic salt which comprises subjecting an aqueous suspension of oxidized sulfur dye particles which also contains inorganic salt to separation by a semipermeable membrane having a pore size giving a cut-off so lower than molecular weight 500 which prevents passage therethrough of the desired size dye particles but permits passage therethrough of water and inorganic salts.

2. A process according to claim 1 which comprises carrying out the membrane separation until the conductivity of the permeate is less than 900 micromhos/cm.

3. A process according to claim 1 wherein the aqueous suspension of oxidized sulfur dye particles is produced by oxidizing an aqueous mixture of a thionation reaction product until it is free of inorganic sulfide.

4. A process according to claim 3 wherein there is no filtration of the suspension between the oxidation and membrane separation steps.

5. A process according to claim 3 wherein the oxidation is effected by aeration.

6. A process according to claim 5 wherein the membrane separation is carried out until the conductivity of the permeate is less than 1000 micromhos/cm.

7. A process according to claim 6 wherein there is no filtration of the suspension between the oxidation and membrane separation steps.

8. A process according to claim 6 wherein the aqueous suspension of oxidized sulfur dye particles is the same as obtained from the oxidation of a thionation mass in the manufacture of a sulfur dye.

9. A process according to claim 6 which comprises treating the thionation reaction product with a polysulfur-lowering-effective amount of sodium sulfite and/or sodium nitrite prior to the oxidation.

10. A process according to claim 6 wherein the oxidation is effected by aeration and the aeration is discontinued before an increase in the size of the oxidized sulfur dye particles begins to occur.

11. A process according to claim 6 which comprises adding water to the aqueous suspension to maintain an essentially constant volume during the membrane separation until the conductivity of the permeate is less than 400 micromhos/cm.

12. A process according to claim 5 wherein the membrane separation is carried out with addition of fresh water to maintain an essentially constant volume of suspension until the conductivity of the permeate is less than 900 micromhos/cm.

13. A process according to claim 12 which further comprises concentration the aqueous dye dispersion by carrying out additional membrane separation without addition of water after the conductivity of the permeate has been lowered to less than 900 micromhos/cm.

14. A process according to claim 12 which further comprises adding a surface active agent to the sulfur dye being treated by the thionation and oxidation steps in an amount sufficient to inhibit agglomeration of the sulfur dye particles.

15. A process according to claim 12 wherein the temperature of the aqueous oxidized sulfur dye suspension is in the range 15° to 50° C. and the pH is in the range 3.5 to 8.5 and the pore size of the membrane is in the range 0.002 to 0.3 micron.

16. A process according to claim 5 wherein the aqueous suspension of oxidized sulfur dye particles is the same as obtained from the oxidation of a thionation mass in the manufacture of a sulfur dye.

17. A process according to claim 5 wherein the oxidized sulfur dye particles are of a size in the range 0.01 to 20 microns.

18. A process according to claim 5 wherein the pore size of the membrane is in the range of 0.002 to 0.3 micron.

19. A process according to claim 1 wherein the aqueous suspension of oxidized sulfur dye particles is one which has been treated with a polysulfur-lowering-effective amount of sodium sulfite and/or sodium nitrite prior to oxidation.

20. A process according to claim 1 wherein the polysulfur content of the aqueous suspension of oxidized sulfur dye particles is zero.

21. A process according to claim 1 wherein the oxidized sulfur dye particles are of a size in the range 0.01 to 20 microns.

22. A process according to claim 1 wherein all of the oxidized sulfur dye particles are no larger than 20 microns and at least 90% are at least 0.1 micron.

23. A process according to claim 1 wherein the membrane has a pore size giving a cut-off no lower than molecular weight 500.

24. A process according to claim 1 wherein the aqueous suspension of oxidized sulfur dye particles to be subjected to membrane separation contains 10 to 35%, by weight, of material other than water.

25. A process according to claim 1 wherein the temperature of the aqueous oxidized sulfur dye suspension is in the range 15 to 50° C. and the pH is in the range 3.5 to 8.5.

26. A process according to claim 1 wherein, during membrane separation treatment, water is added at a rate which will maintain an essentially constant volume of suspension.

27. An aqueous dispersion of an oxidized sulfur dye produced by the process of claim 1.

28. An aqueous dispersion according to claim 27 wherein the dye is in the form of solid particles no larger than 16 microns.

29. An aqueous dispersion according to claim 28 wherein at least 50% of the particles are no larger than 4 microns.

30. An aqueous dispersion according to claim 28 which is free of inorganic sulfides.

31. An aqueous dispersion according to claim 28 wherein the ash content is less than 7% by weight of the dry content.

32. An aqueous dispersion according to claim 28 which is free of inorganic sulfides and wherein at least 50% of the particles are no larger than 4 microns and wherein the ash content is less than 7% by weight, based on the dry content.

33. An aqueous dispersion of oxidized sulfur dye produced by the process of claim 1 wherein the dye is in the form of particles of a size in the range 0.01 to 20 microns and wherein the inorganic sulfide content is such that the dispersion will not emit hydrogen sulfide when acidified to pH 5 and wherein the ash content is less than 7% by weight, based o n the dry content.

34. An aqueous dispersion according to claim 33 which will dissolve in water to an extent of at least 120 g/l of at 100° C. in the presence of 15-23 g/l sodium hydroxide and 60-90 g/l glucose as sole reducing agent without introducing any undissolved material.

35. An aqueous dispersion produced by the process of claim 3.

36. An aqueous dispersion according to claim 11 wherein the inorganic sulfide content is such that the dispersion will not emit hydrogen sulfide when acidified to pH 3 and wherein the ash content is less than 2% by weight, based on the dry content.

37. An aqueous dispersion according to claim 14 wherein all of the dye particles are no larger than 8 microns and at least 90% are at least 0.1 micron.

38. An aqueous dispersion according to claim 14 having a reduction equivalent of zero.

39. An aqueous dispersion according to claim 38 wherein at least 50% of the dye particles are no larger than 4 microns and at least 90% are at least 0.1 micron.

40. An aqueous dispersion according to claim 37 which will dissolve in water to an extent of at least 120 g/l at 100° C. in the presence of 15-23 g/l sodium hydroxide and 60-90 g/l glucose as sole reducing agent without introducing any undissolved material.

41. An aqueous dispersion produced by the process of claim 6.

42. An aqueous dispersion according to claim 13 wherein the inorganic sulfide content is such that the dispersion will not emit hydrogen sulfide when acidified to pH 3 and wherein the ash content is less than 2% by weight, based on the dry content.

43. A method of dyeing a textile substrate comprising treating an aqueous dispersion according to claim 28 with a reducing sugar and alkali to reduce the oxidized sulfur dye and applying the reduced dye to the substrate.

44. A substrate dyed by the method of claim 43.

* * * * *

UNITED STATES PATENT AND TRADEMARK OFFICE
CERTIFICATE OF CORRECTION

PATENT NO. : 4,992,078
DATED : February 12, 1991
INVENTOR(S) : Laszlo A. Meszaros It is certified that error appears in the above-indentified patent and that said Letters Patent is hereby corrected as shown below:

Column 8, line 32, delete "so" and replace with --no--.

Signed and Sealed this

Fourteenth Day of March, 1995

Attest:

BRUCE LEHMAN

Attesting Officer     Commissioner of Patents and Trademarks